United States Patent [19]

Radun

[11] Patent Number: 5,204,604
[45] Date of Patent: Apr. 20, 1993

[54] LINEARIZER FOR A SWITCHED RELUCTANCE GENERATOR

[75] Inventor: Arthur V. Radun, Ballston Lake, N.Y.

[73] Assignee: General Electric Company, Schenectady, N.Y.

[21] Appl. No.: 843,331

[22] Filed: Feb. 28, 1992

[51] Int. Cl.[5] .................................. H02P 19/20
[52] U.S. Cl. .................................. 318/701; 318/254
[58] Field of Search ............... 318/254, 701, 439, 685, 318/696; 310/168

[56] References Cited

U.S. PATENT DOCUMENTS

| | | | |
|---|---|---|---|
| 4,661,756 | 4/1987 | Murphy et al. | 318/701 |
| 4,707,650 | 11/1987 | Bose | 318/696 |
| 4,739,240 | 4/1988 | MacMinn et al. | 319/811 |
| 4,961,038 | 10/1990 | MacMinn | 318/685 |
| 5,072,166 | 12/1991 | Ehsani | 318/685 |
| 5,111,095 | 5/1992 | Hendershot | 310/168 |

Primary Examiner—William M. Shoop, Jr.
Assistant Examiner—John W. Cabeca
Attorney, Agent, or Firm—Jill M. Breedlove; Marvin Snyder

[57] ABSTRACT

A control for an inverter-driven switched reluctance generator includes an angle control for generating a turn-on angle signal and a pulse width angle signal for switching respective inverter switches according to a function $F(\theta_{on}, \theta_{off})$ which depends on the machine geometry and speed of operation. A linearizer is provided for adjusting the turn-on angle signal and the pulse width angle signal by varying the value of the function $F(\theta_{on}, \theta_{off})$ inversely with the dc bus voltage so as to maintain a substantially constant average generator current. In this way, open loop operation of the switched reluctance generator drive is stabilized, and closed loop operation is improved, i.e., by making the system response to step load and commanded voltage changes independent of the dc bus voltage. The control further includes a commutator for switching each respective phase of the switched reluctance generator drive according to the adjusted turn-on angle signal and the adjusted pulse width angle signal generated by the linearizer.

4 Claims, 5 Drawing Sheets

LINEARIZER FOR A SWITCHED RELUCTANCE GENERATOR

The United States Government has rights in this invention pursuant to Contract Number DAAJ02-88-C-0007 awarded by the Defense Advanced Research Projects Agency.

FIELD OF THE INVENTION

The present invention relates generally to switched reluctance machines and, more particularly, to a method and apparatus for stabilizing operation of an inverter-driven switched reluctance generator operating open loop in the full square mode by linearizing the relationship between the inverter switch turn-on and turn-off angles, the dc bus voltage and the average generated current.

BACKGROUND OF THE INVENTION

A switched reluctance machine is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multi-phase switched reluctance machine. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. As a result, there is a magnetic force of attraction between the rotor poles and stator poles that are approaching each other. The current is switched off in each phase before the rotor poles nearest the stator poles of that phase rotate past the aligned position; otherwise, the magnetic force of attraction would produce a negative or braking torque. Hence, by properly positioning the firing pulses relative to the rotor angle, forward or reverse operation and motoring or generating operation can be obtained.

In practice, a switched reluctance generator operating open loop in the full square mode (i.e., such that the inverter switches driving each phase turn on and off once per cycle) is typically unstable. In particular, small perturbations in the dc bus voltage cause the average generated current to increase which, in turn, causes the dc bus voltage to increase further, resulting in an unstable drive. Furthermore, even if feedback is used to close the control loop, the system response to step load and commanded voltage changes depends on the dc bus voltage and is thus not optimum.

Accordingly, it is desirable to stabilize open loop operation of a switched reluctance generator as well as to improve the closed loop performance thereof.

SUMMARY OF THE INVENTION

A control for an inverter-driven switched reluctance generator includes angle control means for generating a turn-on angle signal and a pulse width angle signal for switching the respective inverter switches according to a function $F(\theta_{on}, \theta_{off})$ which depends on the machine geometry and speed of operation. Linearizing means are provided for adjusting the turn-on angle signal and the pulse width angle signal by varying the value of the function $F(\theta_{on}, \theta_{off})$ inversely with the dc bus voltage so as to maintain a substantially constant average generator current. In this way, open loop operation of the switched reluctance generator drive is stabilized, and closed loop operation is improved, i.e., by making the system response to step load and commanded voltage changes independent of the dc bus voltage. The control further includes commutator means for switching each respective phase of the switched reluctance generator drive according to the adjusted turn-on angle signal and the adjusted pulse width angle signal generated by the linearizing means.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
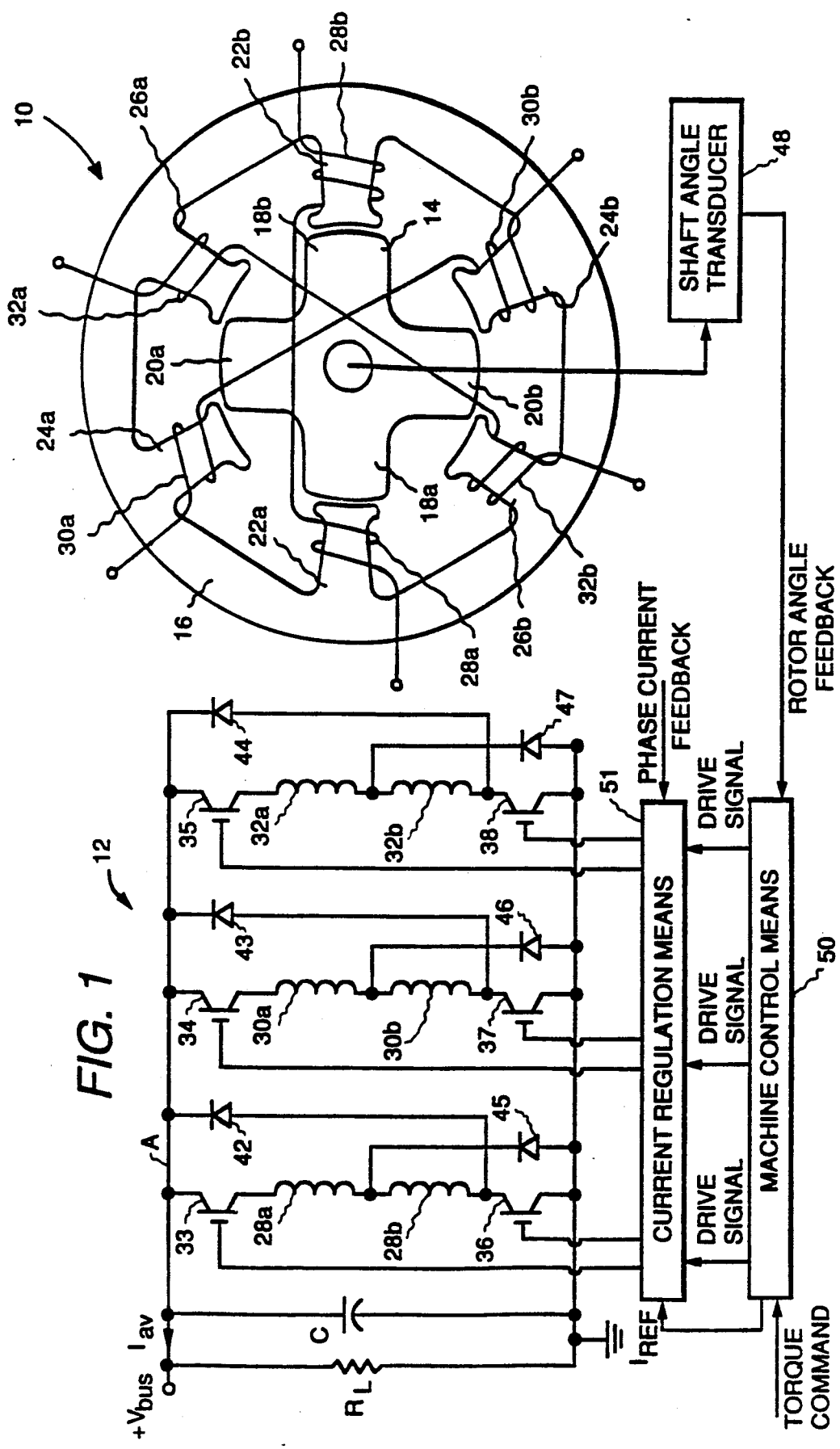
FIG. 1 schematically illustrates a switched reluctance machine drive.

FIG. 1 shows a conventional switched reluctance machine (SRM) drive configuration. By way of example, SRM 10 is illustrated as a three-phase machine with its associated power inverter 12. SRM 10 includes a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or in parallel to form a machine phase winding. As illustrated in FIG. 1, the stator pole windings comprising each companion pair 28a-28b, 30a-30b and 32a-32b, respectively, are connected in series with each other and with an upper current switching device 33, 34 and 35, respectively, and with a lower current switching device 36, 37 and 38, respectively. The upper and lower switching devices each comprise an insulated gate bipolar transistor (IGT), but other suitable current switching devices may be used; for example, field effect transistors (FET's), gate turn-off thyristors (GTO's) or bipolar junction transistors (BJT's). Each phase winding is further coupled to a DC source, such as a battery or a rectified AC source, by flyback or return diodes 45 and 42, 46 and 43, and 47 and 44, respectively. At the end of each conduction interval of each phase, stored magnetic energy in the respective phase winding is returned, through the respective pair of these diodes connected thereto, to the DC source. Each series combination of a phase winding with two corresponding switching devices and two flyback diodes comprises one phase leg of inverter 12. The inverter phase legs are connected in parallel to each other and are driven by the DC source, which impresses a DC voltage $V_{bus}$ across the parallel inverter phase legs. Capacitance C is provided for filtering transient voltages from the DC source and for supplying ripple current to the inverter. Resistance $R_L$ coupled in parallel with capacitance C represents the inverter load.

Typically, as shown in FIG. 1, a shaft angle transducer 48, e.g. an encoder or a resolver, is coupled to rotor 14 for providing rotor angle feedback signals to a machine control means 50. An operator command, such as a torque command, is also generally provided to control means 50. Phase current feedback signals are supplied to a current regulation means 51 which receives phase current feedback signals from current sensors (not shown). Suitable current sensors are well-known in the art, such as: Hall effect current sensors; sensing resistors; sensing transformers; and current sensing transistors, such as those sold under the trademark SENSEFET by Motorola Corporation or those sold under the trademark HEXSense by International Rectifier. Control means 50 further provides a commanded reference current waveform $I_{REF}$ to Current regulation means 51, as described in commonly assigned U.S. Pat. No. 4,961,038, issued to S. R. MacMinn on Oct. 2, 1990, which patent is incorporated by reference herein. In addition, control means 50 includes a commutator for providing firing signals to inverter 12 for energizing the machine phase windings in a predetermined sequence, depending upon the particular quadrant of operation. An exemplary commutator for a microprocessor-based switched reluctance machine drive is described in commonly assigned U S. Pat. No. 4,739,240, issued to S. R. MacMinn and P. M. Szczesny on Apr. 19, 1988, which patent is also incorporated by reference herein.

A commutator according to U.S. Pat. No. 4,739,240 employs a selectively addressable nonvolatile memory, e.g., a ROM, which stores a plurality of standard multiphase firing patterns. Each pattern contains a sequence of stator phase firing pulses for an electrical cycle of the drive. Each pulse of a particular pattern is preferably of equal duration and has a turn-on angle corresponding to a different initial rotor position. The patterns differ only with respect to pulse width. The memory is addressed in synchronism with instantaneous rotor position to produce a sequence of phase switching command pulses with a desired adjustable advance angle and pulse width. As explained in U.S. Pat. No. 4,739,240, the turn-on and turn-off angles for firing the stator phases over a desired speed range depend on the machine geometry and can, for example, be determined experimentally and then implemented in a microprocessor in known fashion, e.g., using polynomials, piecewise linear approximations or look-up tables.

As described hereinabove, a switched reluctance generator operating open loop in the full square mode is typically unstable. Furthermore, even if feedback is used to close the control loop of a switched reluctance generator system, the system response to step load and commanded voltage changes depends on the dc bus voltage and is thus not optimum.

Figure 2:
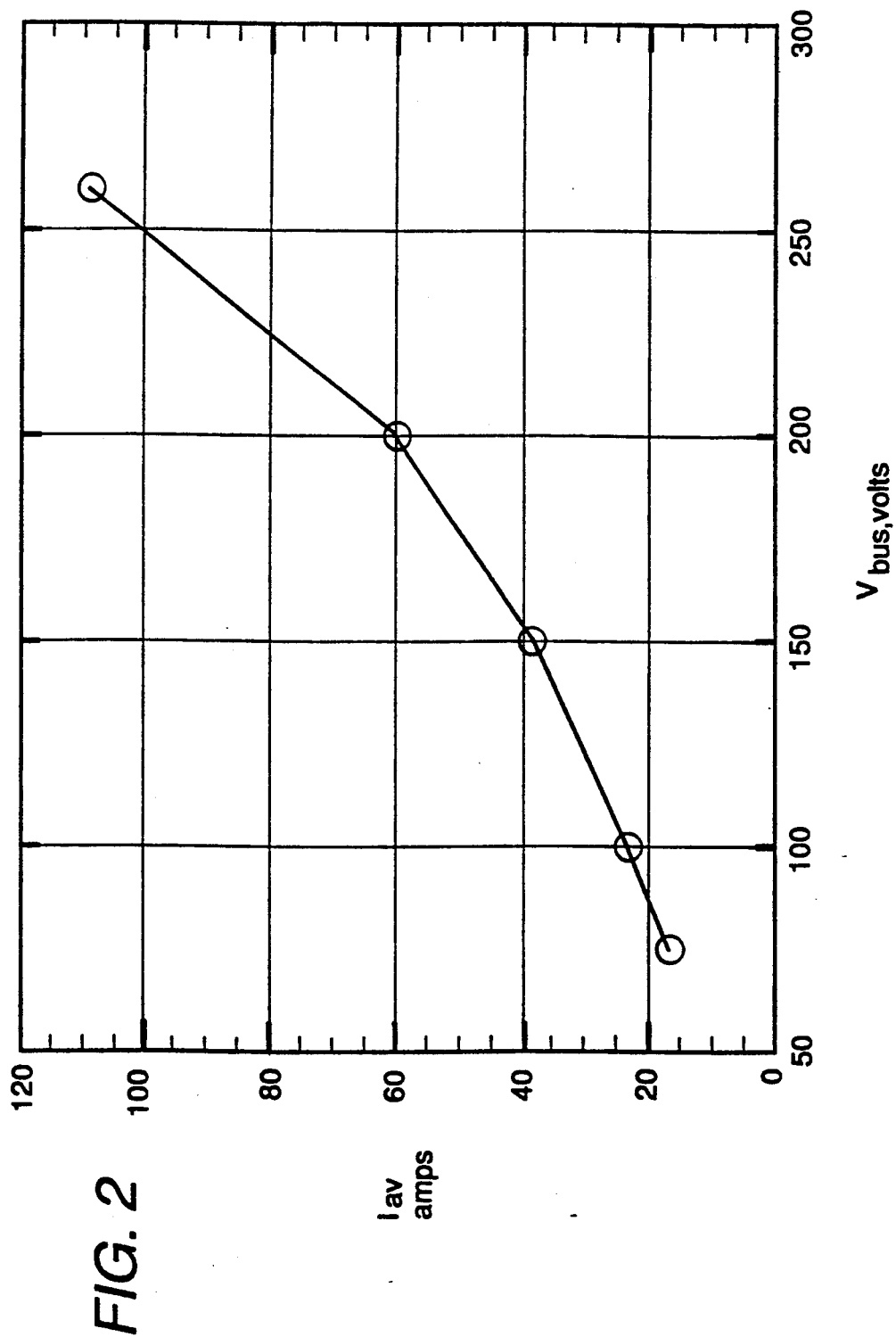
FIGS. 2 and 3 graphically illustrate dc bus voltage $V_{bus}$ versus average generated current $I_{av}$ for an exemplary switched reluctance generator operating open loop in full square mode.
Figure 3:
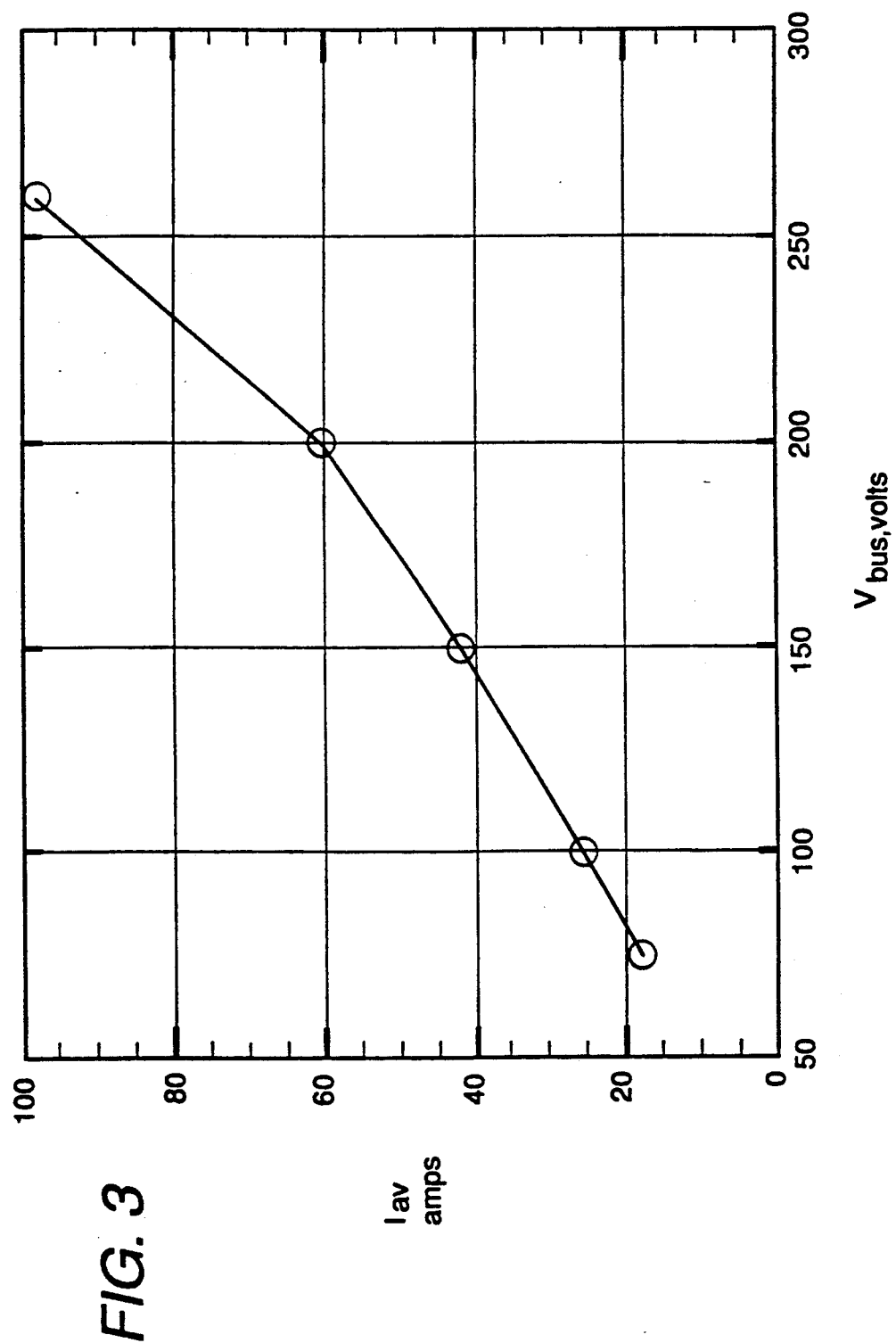

For example, FIG. 2 graphically illustrates average generated current $I_{av}$ versus dc bus voltage $V_{bus}$ for a 33 kW switched reluctance generating system operated at a speed of approximately 17,000 rpm in the full square mode with a pulse width of 27° and a load resistor $R_L$ of 2.42 ohms. FIG. 3 graphically illustrates average generated current $I_{av}$ versus dc bus voltage $V_{bus}$ for the same system with a pulse width of 30.5° and a speed of approximately 17,000 rpm. The systems represented by FIGS. 2 and 3 were unstable.

Figure 4:
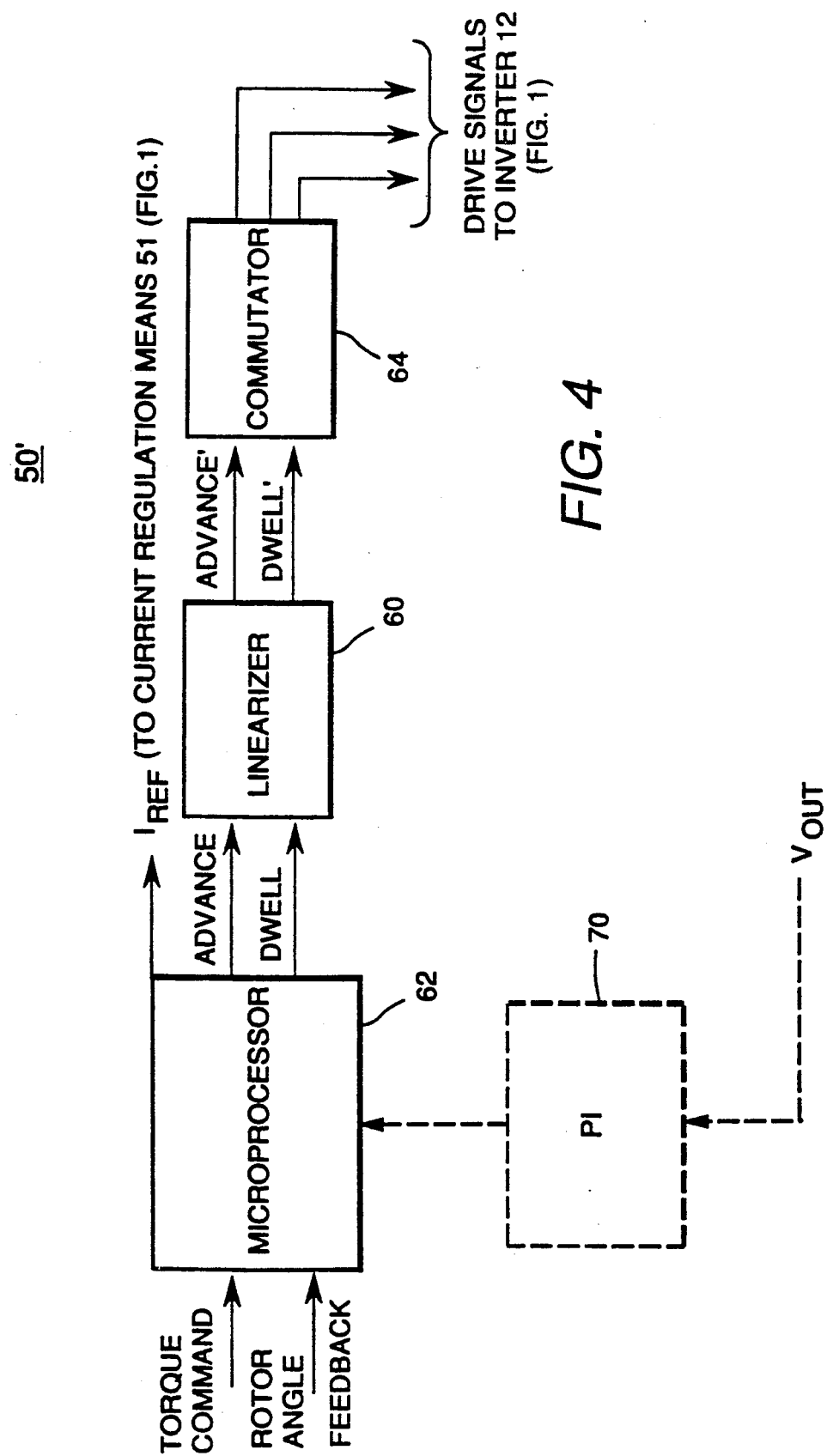
FIG. 4 is a block diagram illustrating a switched reluctance generator drive including a linearizer according to the present invention.

FIG. 4 illustrates machine control means 50' for a switched reluctance generator including a linearizer 60 according to the present invention. In particular, as described in U.S. Pat. No. 4,739,240, cited hereinabove, a microprocessor 62 provides ADVANCE and DWELL signals which determine the turn-on and turn-off angles and the pulse width of the drive signals from a commutator 64. (The angle algorithm used by microprocessor 62 to generate the ADVANCE and DWELL signals is of a well-known type and depends on the machine geometry and operating speed, as indicated hereinabove, and is represented herein by a function $F(\theta_{on}, \theta_{off})$.) According to the present invention, the ADVANCE and DWELL signals as determined by the function $F(\theta_{on}, \theta_{off})$ are processed in linearizer 60, resulting in adjusted angle signals ADVANCE' and DWELL' to commutator 64, such that the relationships among firing signal angles, dc bus voltage and average generated current are linearized. Advantageously, in this way, open loop operation of a switched reluctance generator is stabilized, and closed loop performance is improved over a wide dc bus voltage range.

The linearization algorithm for linearizer 60 is developed as follows. Initially, the average current $I_{av}$ for a given set of turn-on and turn-off angles $\theta_{on}$ and $\theta_{off}$ is set to be proportional to the dc bus voltage $V_{bus}$ according to:

$$I_{av} = \frac{V_{bus}}{V_o} F(\theta_{on}, \theta_{off}), \qquad (1)$$

where $V_o$ represents the nominal dc bus voltage. Furthermore, the dc bus voltage must satisfy the following equation (from the circuit of FIG. 1):

$$\frac{dV_{bus}}{dt} + \left( \frac{1}{R_L C} - \frac{1}{R_K C} \right) = 0, \qquad (2)$$

where $R_K$ represents the value of $F(\theta_{on}, \theta_{off})$ at the respective dc bus voltage $V_{bus}$. From equation (2), it is apparent that a switched reluctance generating system with fixed turn-on and turn-off angles is unstable if the quantity $R_K$ is less than the load resistance $R_L$. To avoid this, a switched reluctance generating system is controlled according to the present invention such that the turn-on and turn-off angles $\theta_{on}$ and $\theta_{off}$, respectively, and hence the pulse width angle, that are determined from the function $F(\theta_{on}, \theta_{off})$ are multiplied by the quantity $$\frac{V_{bus}}{V_o}.$$

In this way, the relationships among pulse width, dc bus voltage and average generated current are linearized, resulting in stable open loop performance and optimum closed loop performance.

Figure 5:
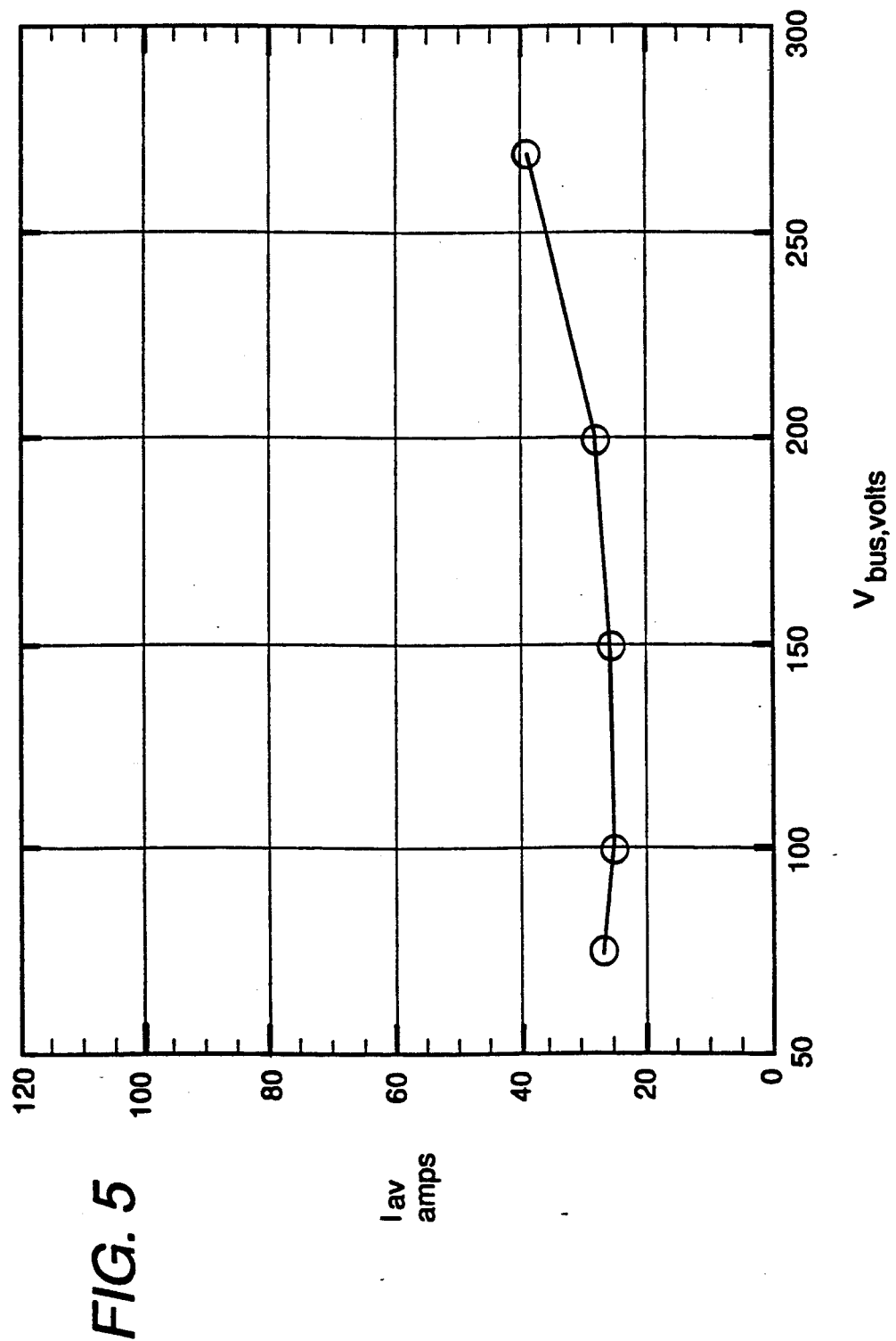
FIG. 5 graphically illustrates dc bus voltage $V_{bus}$ versus average generated current $I_{av}$ for a switched reluctance generator operating open loop according to the present invention.

FIG. 5 graphically illustrates average generated current $I_{av}$ versus dc bus voltage $V_{bus}$ for a 33 kW switched reluctance generating system controlled according to the present invention and operating at a speed of approximately 18,500 rpm. Specifically, by varying the turn-on and turn-off angles, and hence the pulse width, inversely with the dc bus voltage $V_{bus}$ according to the relationship set forth in equation (1) using the linearizer of the present invention, the average generated current $I_{av}$ was maintained substantially constant, resulting in stable open loop operation.

A well-known proportional-integral (PI) control 70 (shown in phantom in FIG. 4) was used to maintain the output voltage $V_{OUT}$ of the switched reluctance generating system at a set value and thereby close the control loop. The generated output voltage was varied from approximately 12 Vdc to approximately 270 Vdc with a load $R_L$ of 2.42 ohms. Advantageously, system performance was substantially independent of the bus voltage $V_{bus}$.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A control for a switched reluctance generator drive including an inverter coupled to a dc bus, comprising:

angle control means for generating a turn-on angle signal and a pulse width angle signal according to a function $F(\theta_{on}, \theta_{off})$ depending on the geometry of said switched reluctance generator and speed of operation;

linearizing means for adjusting the turn-on angle signal and the pulse width angle signal by varying the value of the function $F(\theta_{on}, \theta_{off})$ inversely with the dc bus voltage so as to maintain a substantially constant average generator current; and commutator means for switching each respective phase of the switched reluctance generator drive according to the adjusted turn-on angle signal and the adjusted pulse width angle signal from said linearizing means.

2. The control of claim 1 wherein said switched reluctance generator drive is operated open loop.

3. The control of claim 1, further comprising feedback control means for maintaining a substantially constant generator output voltage.

4. The control of claim 1 wherein said angle control means and said linearizing means are implemented in a microprocessor.

* * * * *